(No Model.)
J. F. W. HENCK.
POTATO DIGGER.
No. 512,442. Patented Jan. 9, 1894.
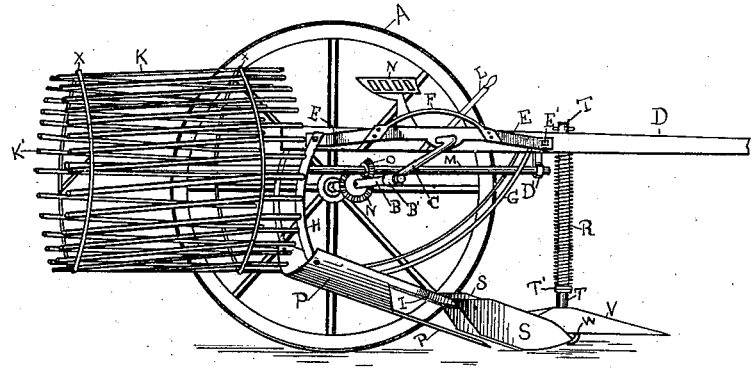
Fig. I.
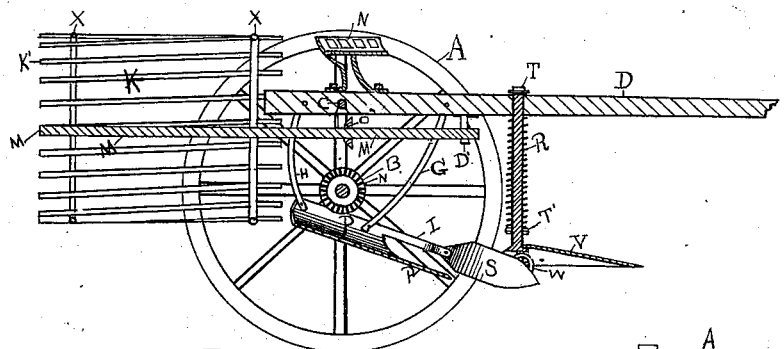
Fig. II.
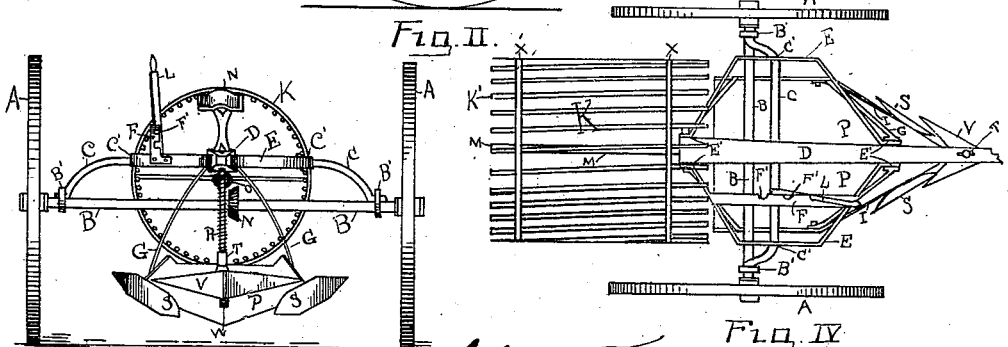
Fig. III.  Fig. IV.
WITNESSES:
Charles S. Watson.
Fannie Robbins.
INVENTOR
John F. William Henck
By A. H. Swarthout
ATTORNEY
THE NATIONAL LITHOGRAPHING COMPANY,
WASHINGTON, D. C.

UNITED STATES PATENT OFFICE.

JOHN F. WILLIAM HENCK, OF BRIDGEPORT, MICHIGAN.

POTATO-DIGGER.

SPECIFICATION forming part of Letters Patent No. 512,442, dated January 9, 1894.

Application filed April 7, 1893. Serial No. 469,380. (No model.)

*To all whom it may concern:*

Be it known that I, JOHN F. WILLIAM HENCK, a citizen of the United States, residing at Bridgeport, in the county of Saginaw and State of Michigan, have invented certain new and useful Improvements in Potato-Diggers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention is a potato digger, and consists in the special construction, arrangement and combination shown.

Figure I is a perspective of my digger with the near wheel removed. Fig. II is a side vertical section showing parts in different position. Fig. III is a front view, and Fig. IV a top view.

In the drawings, A A are the wheels, and B the axle, one of the wheels A being rigidly secured to the axle.

C is a yoke supported at the ends of its arms on the axle B at B', and above the axle.

D is the tongue secured near its rear end to the bow of the yoke C.

E E are side braces secured to the tongue in front of the yoke at E', thence extending rearward and outward, engaging the yoke at C', thence rearward and inward to the tongue at or near its rear end forming side braces for the tongue.

F is a brace, or bow, extending on one side of the tongue from the front of the brace. E to the rear thereof, and is provided with notches F' for securing the lever L as will hereinafter appear.

G G and H H are braces depending from each side of the front and rear of the tongue, respectively, to each side of the front and rear respectively, of the shovel or plow P, and support the shovel or plow P from the tongue.

S S are side cutters forming a double mold board for the shovel P, to which they are secured by the braces I extending from the sides of the shovel.

V is a small double plow placed in front of the shovel, P, and its edges are sharp for the purpose of cutting the potato vines. It is suspended from the tongue D by the rod T extending through the tongue loosely and keyed above the top thereof. At its lower end and above the plow V it, T, is provided with a collar T'. To this collar is attached the coiled spring R, coiled around the rod T, the upper end of the spring being against the tongue. Underneath the plow V and secured thereto, is a small wheel W which runs along behind the plow, V, and by means of it the depth of the cut of the plow V may be regulated. Also by means of the spring R the wheel W and plow V accommodate themselves to the unevenness of the ground. The plow V cuts off the vines. The shovel P assisted by the side pieces S S scoops under the potato hill and plows up the potatoes, which together with the dirt taken up, are pushed out the rear end of the shovel P. Here they are caught in the hollow revolving cylinder K. The circumferential surface of the cylinder K is composed of rods K' secured diagonally and longitudinally across it to the hoops X X, and far enough apart to permit of the dirt passing between the rods, but not the potatoes. This cylinder K is secured to the revolving shaft M journaled to brackets depending from the tongue. The shaft M is provided with a bevel gear O adapted to mesh into the gear wheel N on the axle B. The axle being secured to one wheel, it is obvious that as the wheel revolves the gearing will move and the shaft M thereby revolve, and with it the cylinder K.

L is a lever secured to the yoke C inside of the braces E and at the side of the brace F, and is used by the operator in the seat Z, which is supported on the tongue D, to throw the shovel in and out of the ground and simultaneously the revolving parts out of gear, viz:

Fig. I shows the lever down, engaging the lowest notch in the brace F. The yoke C is also thrown forward allowing the shovel P to descend. As the yoke C is raised, by pulling the lever up the shovel is raised also. The raising of the yoke C also raises the tongue and with it the shaft M, thus throwing the gearing out, as shown in Fig. II.

Having thus described my invention, what I claim as new, and desire to secure by Letters Patent, is—

In a potato digger, the combination with the wheels, the axle secured rigidly in one of the wheels and provided with the gear wheel N, the yoke C supported on the axle, the tongue D supported on the yoke, side braces E E, brace F provided with notches F', lever L secured to the yoke and engaging notches F', shovel P supported underneath by depending braces G G and H H from the tongue D, vine cutter V adjustably supported from the tongue D as described, of the hollow cylinder composed of rods secured diagonally across its longitudinal circumferential surface, and supported on a central shaft M, the shaft M journaled in brackets depending from the tongue D, and provided with a bevel gearing adapted to engage the gear wheel on the axle, whereby the cylinder is made to revolve, substantially as and for the purpose set forth.

In testimony whereof I affix my signature in presence of two witnesses.

JOHN F. WILLIAM HENCK.

Witnesses:
  A. H. SWARTHOUT,
  FANNIE ROBBINS.